United States Patent
Vinson et al.

(10) Patent No.: US 9,588,898 B1
(45) Date of Patent: Mar. 7, 2017

(54) FULLNESS CONTROL FOR MEDIA-BASED CACHE OPERATING IN A STEADY STATE

(71) Applicant: Western Digital Technologies, Inc., Irvine, CA (US)

(72) Inventors: Wayne H. Vinson, Longmont, CO (US); Robert Brummet, Louisville, CO (US)

(73) Assignee: Western Digital Technologies, Inc., Irvine, CA (US)

(*) Notice: Subject to any disclaimer, the term of this patent is extended or adjusted under 35 U.S.C. 154(b) by 3 days.

(21) Appl. No.: 14/728,293

(22) Filed: Jun. 2, 2015

(51) Int. Cl.
  G06F 12/00 (2006.01)
  G06F 12/08 (2016.01)
  G06F 3/06 (2006.01)

(52) U.S. Cl.
  CPC ........ G06F 12/0871 (2013.01); G06F 3/0613 (2013.01); G06F 3/0653 (2013.01); G06F 3/0656 (2013.01); G06F 3/0676 (2013.01); G06F 2003/0691 (2013.01); G06F 2003/0692 (2013.01); G06F 2212/1021 (2013.01); G06F 2212/21 (2013.01); G06F 2212/224 (2013.01); G06F 2212/281 (2013.01); G06F 2212/311 (2013.01); G06F 2212/604 (2013.01); G06F 2212/70 (2013.01)

(58) Field of Classification Search
  CPC .. G06F 12/0871; G06F 3/0653; G06F 3/0656; G06F 3/0613; G06F 3/0676; G06F 2212/1021; G06F 2212/224; G06F 2212/281; G06F 2003/0692; G06F 2212/604; G06F 2212/70; G06F 2212/21; G06F 2212/311; G06F 2003/0691; G06F 12/127
  USPC .......... 711/144, 133, 135, 119, 113; 713/320
  See application file for complete search history.

(56) References Cited

U.S. PATENT DOCUMENTS

| | | | |
|---|---|---|---|
| 5,222,224 A * | 6/1993 | Flynn | G06F 12/0822 711/120 |
| 6,018,789 A | 1/2000 | Sokolov et al. | |
| 6,065,095 A | 5/2000 | Sokolov et al. | |
| 6,078,452 A | 6/2000 | Kittilson et al. | |
| 6,081,447 A | 6/2000 | Lofgren et al. | |
| 6,092,149 A | 7/2000 | Hicken et al. | |
| 6,092,150 A | 7/2000 | Sokolov et al. | |
| 6,094,707 A | 7/2000 | Sokolov et al. | |
| 6,105,104 A | 8/2000 | Guttmann et al. | |
| 6,111,717 A | 8/2000 | Cloke et al. | |
| 6,145,052 A | 11/2000 | Howe et al. | |
| 6,175,893 B1 | 1/2001 | D'Souza et al. | |
| 6,178,056 B1 | 1/2001 | Cloke et al. | |
| 6,191,909 B1 | 2/2001 | Cloke et al. | |

(Continued)

Primary Examiner — Hong Kim
(74) Attorney, Agent, or Firm — Brownstein Hyatt Farber Schreck, LLP

(57) ABSTRACT

A data storage system incorporating a write-caching subsystem that implements a steady-state media-based cache is described. The steady-state of the media-based cache can be obtained by directing non-sequential write commands and data received from the host device to multiple independent cache locations and, thereafter, selectively copying or moving such data between the caches so that none of the caches are either too full or too empty. In this manner, a non-sequential write command can be cached in a power-safe manner until it is efficient and/or convenient to write such data to the mainstore portion of the physical media.

20 Claims, 6 Drawing Sheets

(56) References Cited

U.S. PATENT DOCUMENTS

| | | |
|---|---|---|
| 6,195,218 B1 | 2/2001 | Guttmann et al. |
| 6,205,494 B1 | 3/2001 | Williams |
| 6,208,477 B1 | 3/2001 | Cloke et al. |
| 6,223,303 B1 | 4/2001 | Billings et al. |
| 6,230,233 B1 | 5/2001 | Lofgren et al. |
| 6,246,346 B1 | 6/2001 | Cloke et al. |
| 6,249,393 B1 | 6/2001 | Billings et al. |
| 6,256,695 B1 | 7/2001 | Williams |
| 6,262,857 B1 | 7/2001 | Hull et al. |
| 6,263,459 B1 | 7/2001 | Schibilla |
| 6,272,694 B1 | 8/2001 | Weaver et al. |
| 6,278,568 B1 | 8/2001 | Cloke et al. |
| 6,279,089 B1 | 8/2001 | Schibilla et al. |
| 6,289,484 B1 | 9/2001 | Rothberg et al. |
| 6,292,912 B1 | 9/2001 | Cloke et al. |
| 6,310,740 B1 | 10/2001 | Dunbar et al. |
| 6,317,850 B1 | 11/2001 | Rothberg |
| 6,327,106 B1 | 12/2001 | Rothberg |
| 6,337,778 B1 | 1/2002 | Gagne |
| 6,369,969 B1 | 4/2002 | Christiansen et al. |
| 6,384,999 B1 | 5/2002 | Schibilla |
| 6,388,833 B1 | 5/2002 | Golowka et al. |
| 6,405,342 B1 | 6/2002 | Lee |
| 6,408,357 B1 | 6/2002 | Hanmann et al. |
| 6,408,406 B1 | 6/2002 | Parris |
| 6,411,452 B1 | 6/2002 | Cloke |
| 6,411,458 B1 | 6/2002 | Billings et al. |
| 6,412,083 B1 | 6/2002 | Rothberg et al. |
| 6,415,349 B1 | 7/2002 | Hull et al. |
| 6,425,128 B1 | 7/2002 | Krapf et al. |
| 6,441,981 B1 | 8/2002 | Cloke et al. |
| 6,442,328 B1 | 8/2002 | Elliott et al. |
| 6,445,524 B1 | 9/2002 | Nazarian et al. |
| 6,449,767 B1 | 9/2002 | Krapf et al. |
| 6,453,115 B1 | 9/2002 | Boyle |
| 6,470,420 B1 | 10/2002 | Hospodor |
| 6,480,020 B1 | 11/2002 | Jung et al. |
| 6,480,349 B1 | 11/2002 | Kim et al. |
| 6,480,932 B1 | 11/2002 | Vallis et al. |
| 6,483,986 B1 | 11/2002 | Krapf |
| 6,487,032 B1 | 11/2002 | Cloke et al. |
| 6,490,635 B1 | 12/2002 | Holmes |
| 6,493,173 B1 | 12/2002 | Kim et al. |
| 6,499,083 B1 | 12/2002 | Hamlin |
| 6,519,104 B1 | 2/2003 | Cloke et al. |
| 6,525,892 B1 | 2/2003 | Dunbar et al. |
| 6,545,830 B1 | 4/2003 | Briggs et al. |
| 6,546,489 B1 | 4/2003 | Frank, Jr. et al. |
| 6,550,021 B1 | 4/2003 | Dalphy et al. |
| 6,552,880 B1 | 4/2003 | Dunbar et al. |
| 6,553,457 B1 | 4/2003 | Wilkins et al. |
| 6,578,106 B1 | 6/2003 | Price |
| 6,580,573 B1 | 6/2003 | Hull et al. |
| 6,594,183 B1 | 7/2003 | Lofgren et al. |
| 6,600,620 B1 | 7/2003 | Krounbi et al. |
| 6,601,137 B1 | 7/2003 | Castro et al. |
| 6,603,622 B1 | 8/2003 | Christiansen et al. |
| 6,603,625 B1 | 8/2003 | Hospodor et al. |
| 6,604,220 B1 | 8/2003 | Lee |
| 6,606,682 B1 | 8/2003 | Dang et al. |
| 6,606,714 B1 | 8/2003 | Thelin |
| 6,606,717 B1 | 8/2003 | Yu et al. |
| 6,611,393 B1 | 8/2003 | Nguyen et al. |
| 6,615,312 B1 | 9/2003 | Hamlin et al. |
| 6,639,748 B1 | 10/2003 | Christiansen et al. |
| 6,647,481 B1 | 11/2003 | Luu et al. |
| 6,654,193 B1 | 11/2003 | Thelin |
| 6,657,810 B1 | 12/2003 | Kupferman |
| 6,661,591 B1 | 12/2003 | Rothberg |
| 6,665,772 B1 | 12/2003 | Hamlin |
| 6,687,073 B1 | 2/2004 | Kupferman |
| 6,687,078 B1 | 2/2004 | Kim |
| 6,687,850 B1 | 2/2004 | Rothberg |
| 6,690,523 B1 | 2/2004 | Nguyen et al. |
| 6,690,882 B1 | 2/2004 | Hanmann et al. |
| 6,691,198 B1 | 2/2004 | Hamlin |
| 6,691,213 B1 | 2/2004 | Luu et al. |
| 6,691,255 B1 | 2/2004 | Rothberg et al. |
| 6,693,760 B1 | 2/2004 | Krounbi et al. |
| 6,694,477 B1 | 2/2004 | Lee |
| 6,697,914 B1 | 2/2004 | Hospodor et al. |
| 6,704,153 B1 | 3/2004 | Rothberg et al. |
| 6,708,251 B1 | 3/2004 | Boyle et al. |
| 6,710,951 B1 | 3/2004 | Cloke |
| 6,711,628 B1 | 3/2004 | Thelin |
| 6,711,635 B1 | 3/2004 | Wang |
| 6,711,660 B1 | 3/2004 | Milne et al. |
| 6,715,044 B2 | 3/2004 | Lofgren et al. |
| 6,724,982 B1 | 4/2004 | Hamlin |
| 6,725,329 B1 | 4/2004 | Ng et al. |
| 6,735,650 B1 | 5/2004 | Rothberg |
| 6,735,693 B1 | 5/2004 | Hamlin |
| 6,744,772 B1 | 6/2004 | Eneboe et al. |
| 6,745,283 B1 | 6/2004 | Dang |
| 6,751,402 B1 | 6/2004 | Elliott et al. |
| 6,757,481 B1 | 6/2004 | Nazarian et al. |
| 6,772,281 B2 | 8/2004 | Hamlin |
| 6,781,826 B1 | 8/2004 | Goldstone et al. |
| 6,782,449 B1 | 8/2004 | Codilian et al. |
| 6,791,779 B1 | 9/2004 | Singh et al. |
| 6,792,486 B1 | 9/2004 | Hanan et al. |
| 6,799,274 B1 | 9/2004 | Hamlin |
| 6,811,427 B2 | 11/2004 | Garrett et al. |
| 6,826,003 B1 | 11/2004 | Subrahmanyam |
| 6,826,614 B1 | 11/2004 | Hanmann et al. |
| 6,832,041 B1 | 12/2004 | Boyle |
| 6,832,929 B2 | 12/2004 | Garrett et al. |
| 6,845,405 B1 | 1/2005 | Thelin |
| 6,845,427 B1 | 1/2005 | Atai-Azimi |
| 6,850,443 B2 | 2/2005 | Lofgren et al. |
| 6,851,055 B1 | 2/2005 | Boyle et al. |
| 6,851,063 B1 | 2/2005 | Boyle et al. |
| 6,853,731 B1 | 2/2005 | Boyle et al. |
| 6,854,022 B1 | 2/2005 | Thelin |
| 6,862,660 B1 | 3/2005 | Wilkins et al. |
| 6,880,043 B1 | 4/2005 | Castro et al. |
| 6,882,486 B1 | 4/2005 | Kupferman |
| 6,884,085 B1 | 4/2005 | Goldstone |
| 6,888,831 B1 | 5/2005 | Hospodor et al. |
| 6,892,217 B1 | 5/2005 | Hanmann et al. |
| 6,892,249 B1 | 5/2005 | Codilian et al. |
| 6,892,313 B1 | 5/2005 | Codilian et al. |
| 6,895,455 B1 | 5/2005 | Rothberg |
| 6,895,500 B1 | 5/2005 | Rothberg |
| 6,898,730 B1 | 5/2005 | Hanan |
| 6,910,099 B1 | 6/2005 | Wang et al. |
| 6,928,470 B1 | 8/2005 | Hamlin |
| 6,931,439 B1 | 8/2005 | Hanmann et al. |
| 6,934,104 B1 | 8/2005 | Kupferman |
| 6,934,713 B2 | 8/2005 | Schwartz et al. |
| 6,940,873 B2 | 9/2005 | Boyle et al. |
| 6,943,978 B1 | 9/2005 | Lee |
| 6,948,165 B1 | 9/2005 | Luu et al. |
| 6,950,267 B1 | 9/2005 | Liu et al. |
| 6,954,733 B1 | 10/2005 | Ellis et al. |
| 6,961,814 B1 | 11/2005 | Thelin et al. |
| 6,965,489 B1 | 11/2005 | Lee et al. |
| 6,965,563 B1 | 11/2005 | Hospodor et al. |
| 6,965,966 B1 | 11/2005 | Rothberg et al. |
| 6,967,799 B1 | 11/2005 | Lee |
| 6,968,422 B1 | 11/2005 | Codilian et al. |
| 6,968,450 B1 | 11/2005 | Rothberg et al. |
| 6,973,495 B1 | 12/2005 | Milne et al. |
| 6,973,570 B1 | 12/2005 | Hamlin |
| 6,976,190 B1 | 12/2005 | Goldstone |
| 6,983,316 B1 | 1/2006 | Milne et al. |
| 6,986,007 B1 | 1/2006 | Procyk et al. |
| 6,986,154 B1 | 1/2006 | Price et al. |
| 6,995,933 B1 | 2/2006 | Codilian et al. |
| 6,996,501 B1 | 2/2006 | Rothberg |
| 6,996,669 B1 | 2/2006 | Dang et al. |
| 7,002,926 B1 | 2/2006 | Eneboe et al. |
| 7,003,674 B1 | 2/2006 | Hamlin |
| 7,006,316 B1 | 2/2006 | Sargenti, Jr. et al. |

(56) References Cited

U.S. PATENT DOCUMENTS

| | | |
|---|---|---|
| 7,009,820 B1 | 3/2006 | Hogg |
| 7,023,639 B1 | 4/2006 | Kupferman |
| 7,024,491 B1 | 4/2006 | Hanmann et al. |
| 7,024,549 B1 | 4/2006 | Luu et al. |
| 7,024,614 B1 | 4/2006 | Thelin et al. |
| 7,027,716 B1 | 4/2006 | Boyle et al. |
| 7,028,174 B1 | 4/2006 | Atai-Azimi et al. |
| 7,031,902 B1 | 4/2006 | Catiller |
| 7,046,465 B1 | 5/2006 | Kupferman |
| 7,046,488 B1 | 5/2006 | Hogg |
| 7,050,252 B1 | 5/2006 | Vallis |
| 7,054,937 B1 | 5/2006 | Milne et al. |
| 7,055,000 B1 | 5/2006 | Severtson |
| 7,055,167 B1 | 5/2006 | Masters |
| 7,057,836 B1 | 6/2006 | Kupferman |
| 7,062,398 B1 | 6/2006 | Rothberg |
| 7,075,746 B1 | 7/2006 | Kupferman |
| 7,076,604 B1 | 7/2006 | Thelin |
| 7,082,494 B1 | 7/2006 | Thelin et al. |
| 7,088,538 B1 | 8/2006 | Codilian et al. |
| 7,088,545 B1 | 8/2006 | Singh et al. |
| 7,092,186 B1 | 8/2006 | Hogg |
| 7,095,577 B1 | 8/2006 | Codilian et al. |
| 7,099,095 B1 | 8/2006 | Subrahmanyam et al. |
| 7,106,537 B1 | 9/2006 | Bennett |
| 7,106,947 B2 | 9/2006 | Boyle et al. |
| 7,110,202 B1 | 9/2006 | Vasquez |
| 7,111,116 B1 | 9/2006 | Boyle et al. |
| 7,114,029 B1 | 9/2006 | Thelin |
| 7,120,737 B1 | 10/2006 | Thelin |
| 7,120,806 B1 | 10/2006 | Codilian et al. |
| 7,126,776 B1 | 10/2006 | Warren, Jr. et al. |
| 7,129,763 B1 | 10/2006 | Bennett et al. |
| 7,133,600 B1 | 11/2006 | Boyle |
| 7,136,244 B1 | 11/2006 | Rothberg |
| 7,146,094 B1 | 12/2006 | Boyle |
| 7,149,046 B1 | 12/2006 | Coker et al. |
| 7,150,036 B1 | 12/2006 | Milne et al. |
| 7,155,616 B1 | 12/2006 | Hamlin |
| 7,171,108 B1 | 1/2007 | Masters et al. |
| 7,171,110 B1 | 1/2007 | Wilshire |
| 7,194,576 B1 | 3/2007 | Boyle |
| 7,200,698 B1 | 4/2007 | Rothberg |
| 7,205,805 B1 | 4/2007 | Bennett |
| 7,206,497 B1 | 4/2007 | Boyle et al. |
| 7,215,496 B1 | 5/2007 | Kupferman et al. |
| 7,215,771 B1 | 5/2007 | Hamlin |
| 7,237,054 B1 | 6/2007 | Cain et al. |
| 7,240,161 B1 | 7/2007 | Boyle |
| 7,249,365 B1 | 7/2007 | Price et al. |
| 7,263,709 B1 | 8/2007 | Krapf |
| 7,274,639 B1 | 9/2007 | Codilian et al. |
| 7,274,659 B2 | 9/2007 | Hospodor |
| 7,275,116 B1 | 9/2007 | Hanmann et al. |
| 7,280,302 B1 | 10/2007 | Masiewicz |
| 7,292,774 B1 | 11/2007 | Masters et al. |
| 7,292,775 B1 | 11/2007 | Boyle et al. |
| 7,296,284 B1 | 11/2007 | Price et al. |
| 7,302,501 B1 | 11/2007 | Cain et al. |
| 7,302,579 B1 | 11/2007 | Cain et al. |
| 7,318,088 B1 | 1/2008 | Mann |
| 7,319,806 B1 | 1/2008 | Willner et al. |
| 7,325,244 B2 | 1/2008 | Boyle et al. |
| 7,330,323 B1 | 2/2008 | Singh et al. |
| 7,346,790 B1 | 3/2008 | Klein |
| 7,366,641 B1 | 4/2008 | Masiewicz et al. |
| 7,369,340 B1 | 5/2008 | Dang et al. |
| 7,369,343 B1 | 5/2008 | Yeo et al. |
| 7,372,650 B1 | 5/2008 | Kupferman |
| 7,380,147 B1 | 5/2008 | Sun |
| 7,392,340 B1 | 6/2008 | Dang et al. |
| 7,404,013 B1 | 7/2008 | Masiewicz |
| 7,406,545 B1 | 7/2008 | Rothberg et al. |
| 7,415,571 B1 | 8/2008 | Hanan |
| 7,436,610 B1 | 10/2008 | Thelin |
| 7,437,502 B1 | 10/2008 | Coker |
| 7,440,214 B1 | 10/2008 | Ell et al. |
| 7,451,344 B1 | 11/2008 | Rothberg |
| 7,461,202 B2 | 12/2008 | Forrer, Jr. et al. |
| 7,471,483 B1 | 12/2008 | Ferris et al. |
| 7,471,486 B1 | 12/2008 | Coker et al. |
| 7,486,060 B1 | 2/2009 | Bennett |
| 7,496,493 B1 | 2/2009 | Stevens |
| 7,518,819 B1 | 4/2009 | Yu et al. |
| 7,526,184 B1 | 4/2009 | Parkinen et al. |
| 7,539,924 B1 | 5/2009 | Vasquez et al. |
| 7,543,117 B1 | 6/2009 | Hanan |
| 7,551,383 B1 | 6/2009 | Kupferman |
| 7,562,282 B1 | 7/2009 | Rothberg |
| 7,577,973 B1 | 8/2009 | Kapner, III et al. |
| 7,596,797 B1 | 9/2009 | Kapner, III et al. |
| 7,599,139 B1 | 10/2009 | Bombet et al. |
| 7,619,841 B1 | 11/2009 | Kupferman |
| 7,647,544 B1 | 1/2010 | Masiewicz |
| 7,649,704 B1 | 1/2010 | Bombet et al. |
| 7,653,927 B1 | 1/2010 | Kapner, III et al. |
| 7,656,603 B1 | 2/2010 | Xing |
| 7,656,763 B1 | 2/2010 | Jin et al. |
| 7,657,149 B2 | 2/2010 | Boyle |
| 7,672,072 B1 | 3/2010 | Boyle et al. |
| 7,673,075 B1 | 3/2010 | Masiewicz |
| 7,688,540 B1 | 3/2010 | Mei et al. |
| 7,724,461 B1 | 5/2010 | McFadyen et al. |
| 7,725,584 B1 | 5/2010 | Hanmann et al. |
| 7,730,295 B1 | 6/2010 | Lee |
| 7,760,458 B1 | 7/2010 | Trinh |
| 7,768,776 B1 | 8/2010 | Szeremeta et al. |
| 7,804,657 B1 | 9/2010 | Hogg et al. |
| 7,813,954 B1 | 10/2010 | Price et al. |
| 7,827,320 B1 | 11/2010 | Stevens |
| 7,839,588 B1 | 11/2010 | Dang et al. |
| 7,843,660 B1 | 11/2010 | Yeo |
| 7,852,596 B2 | 12/2010 | Boyle et al. |
| 7,859,782 B1 | 12/2010 | Lee |
| 7,872,822 B1 | 1/2011 | Rothberg |
| 7,898,756 B1 | 3/2011 | Wang |
| 7,898,762 B1 | 3/2011 | Guo et al. |
| 7,900,037 B1 | 3/2011 | Fallone et al. |
| 7,907,364 B2 | 3/2011 | Boyle et al. |
| 7,929,234 B1 | 4/2011 | Boyle et al. |
| 7,933,087 B1 | 4/2011 | Tsai et al. |
| 7,933,090 B1 | 4/2011 | Jung et al. |
| 7,934,030 B1 | 4/2011 | Sargenti, Jr. et al. |
| 7,940,491 B2 | 5/2011 | Szeremeta et al. |
| 7,944,639 B1 | 5/2011 | Wang |
| 7,945,727 B2 | 5/2011 | Rothberg et al. |
| 7,949,564 B1 | 5/2011 | Hughes et al. |
| 7,974,029 B2 | 7/2011 | Tsai et al. |
| 7,974,039 B1 | 7/2011 | Xu et al. |
| 7,982,993 B1 | 7/2011 | Tsai et al. |
| 7,984,200 B1 | 7/2011 | Bombet et al. |
| 7,990,648 B1 | 8/2011 | Wang |
| 7,992,179 B1 | 8/2011 | Kapner, III et al. |
| 8,004,785 B1 | 8/2011 | Tsai et al. |
| 8,006,027 B1 | 8/2011 | Stevens et al. |
| 8,014,094 B1 | 9/2011 | Jin |
| 8,014,977 B1 | 9/2011 | Masiewicz et al. |
| 8,019,914 B1 | 9/2011 | Vasquez et al. |
| 8,040,625 B1 | 10/2011 | Boyle et al. |
| 8,078,943 B1 | 12/2011 | Lee |
| 8,079,045 B2 | 12/2011 | Krapf et al. |
| 8,082,433 B1 | 12/2011 | Fallone et al. |
| 8,085,487 B1 | 12/2011 | Jung et al. |
| 8,089,719 B1 | 1/2012 | Dakroub |
| 8,090,902 B1 | 1/2012 | Bennett et al. |
| 8,090,906 B1 | 1/2012 | Blaha et al. |
| 8,091,112 B1 | 1/2012 | Elliott et al. |
| 8,094,396 B1 | 1/2012 | Zhang et al. |
| 8,094,401 B1 | 1/2012 | Peng et al. |
| 8,116,020 B1 | 2/2012 | Lee |
| 8,116,025 B1 | 2/2012 | Chan et al. |
| 8,134,793 B1 | 3/2012 | Vasquez et al. |
| 8,134,798 B1 | 3/2012 | Thelin et al. |
| 8,139,301 B1 | 3/2012 | Li et al. |

(56) References Cited

U.S. PATENT DOCUMENTS

| | | |
|---|---|---|
| 8,139,310 B1 | 3/2012 | Hogg |
| 8,144,419 B1 | 3/2012 | Liu |
| 8,145,452 B1 | 3/2012 | Masiewicz et al. |
| 8,149,528 B1 | 4/2012 | Suratman et al. |
| 8,154,812 B1 | 4/2012 | Boyle et al. |
| 8,159,768 B1 | 4/2012 | Miyamura |
| 8,161,328 B1 | 4/2012 | Wilshire |
| 8,164,849 B1 | 4/2012 | Szeremeta et al. |
| 8,174,780 B1 | 5/2012 | Tsai et al. |
| 8,190,575 B1 | 5/2012 | Ong et al. |
| 8,194,338 B1 | 6/2012 | Zhang |
| 8,194,340 B1 | 6/2012 | Boyle et al. |
| 8,194,341 B1 | 6/2012 | Boyle |
| 8,201,066 B1 | 6/2012 | Wang |
| 8,271,692 B1 | 9/2012 | Dinh et al. |
| 8,279,550 B1 | 10/2012 | Hogg |
| 8,281,218 B1 | 10/2012 | Ybarra et al. |
| 8,285,923 B2 | 10/2012 | Stevens |
| 8,289,656 B1 | 10/2012 | Huber |
| 8,305,705 B1 | 11/2012 | Roohr |
| 8,307,156 B1 | 11/2012 | Codilian et al. |
| 8,310,775 B1 | 11/2012 | Boguslawski et al. |
| 8,315,006 B1 | 11/2012 | Chahwan et al. |
| 8,316,263 B1 | 11/2012 | Gough et al. |
| 8,320,067 B1 | 11/2012 | Tsai et al. |
| 8,324,974 B1 | 12/2012 | Bennett |
| 8,332,695 B2 | 12/2012 | Dalphy et al. |
| 8,341,337 B1 | 12/2012 | Ong et al. |
| 8,350,628 B1 | 1/2013 | Bennett |
| 8,356,184 B1 | 1/2013 | Meyer et al. |
| 8,370,683 B1 | 2/2013 | Ryan et al. |
| 8,375,225 B1 | 2/2013 | Ybarra |
| 8,375,274 B1 | 2/2013 | Bonke |
| 8,380,922 B1 | 2/2013 | DeForest et al. |
| 8,390,948 B2 | 3/2013 | Hogg |
| 8,390,952 B1 | 3/2013 | Szeremeta |
| 8,392,689 B1 | 3/2013 | Lott |
| 8,407,393 B1 | 3/2013 | Yolar et al. |
| 8,413,010 B1 | 4/2013 | Vasquez et al. |
| 8,417,566 B2 | 4/2013 | Price et al. |
| 8,421,663 B1 | 4/2013 | Bennett |
| 8,422,172 B1 | 4/2013 | Dakroub et al. |
| 8,427,771 B1 | 4/2013 | Tsai |
| 8,429,343 B1 | 4/2013 | Tsai |
| 8,433,937 B1 | 4/2013 | Wheelock et al. |
| 8,433,977 B1 | 4/2013 | Vasquez et al. |
| 8,458,526 B2 | 6/2013 | Dalphy et al. |
| 8,462,466 B2 | 6/2013 | Huber |
| 8,467,151 B1 | 6/2013 | Huber |
| 8,489,841 B1 | 7/2013 | Strecke et al. |
| 8,493,679 B1 | 7/2013 | Boguslawski et al. |
| 8,498,074 B1 | 7/2013 | Mobley et al. |
| 8,499,198 B1 | 7/2013 | Messenger et al. |
| 8,512,049 B1 | 8/2013 | Huber et al. |
| 8,514,506 B1 | 8/2013 | Li et al. |
| 8,531,791 B1 | 9/2013 | Reid et al. |
| 8,554,741 B1 | 10/2013 | Malina |
| 8,560,759 B1 | 10/2013 | Boyle et al. |
| 8,565,053 B1 | 10/2013 | Chung |
| 8,576,511 B1 | 11/2013 | Coker et al. |
| 8,578,100 B1 | 11/2013 | Huynh et al. |
| 8,578,242 B1 | 11/2013 | Burton et al. |
| 8,589,773 B1 | 11/2013 | Wang et al. |
| 8,593,753 B1 | 11/2013 | Anderson |
| 8,595,432 B1 | 11/2013 | Vinson et al. |
| 8,599,510 B1 | 12/2013 | Fallone |
| 8,601,248 B2 | 12/2013 | Thorsted |
| 8,611,032 B2 | 12/2013 | Champion et al. |
| 8,612,650 B1 | 12/2013 | Carrie et al. |
| 8,612,706 B1 | 12/2013 | Madril et al. |
| 8,612,798 B1 | 12/2013 | Tsai |
| 8,619,383 B1 | 12/2013 | Jung et al. |
| 8,621,115 B1 | 12/2013 | Bombet et al. |
| 8,621,133 B1 | 12/2013 | Boyle |
| 8,626,463 B2 | 1/2014 | Stevens et al. |
| 8,630,052 B1 | 1/2014 | Jung et al. |
| 8,630,056 B1 | 1/2014 | Ong |
| 8,631,188 B1 | 1/2014 | Heath et al. |
| 8,634,158 B1 | 1/2014 | Chahwan et al. |
| 8,635,412 B1 | 1/2014 | Wilshire |
| 8,640,007 B1 | 1/2014 | Schulze |
| 8,654,619 B1 | 2/2014 | Cheng |
| 8,661,193 B1 | 2/2014 | Cobos et al. |
| 8,667,248 B1 | 3/2014 | Neppalli |
| 8,670,205 B1 | 3/2014 | Malina et al. |
| 8,683,295 B1 | 3/2014 | Syu et al. |
| 8,683,457 B1 | 3/2014 | Hughes et al. |
| 8,687,306 B1 | 4/2014 | Coker et al. |
| 8,693,133 B1 | 4/2014 | Lee et al. |
| 8,694,841 B1 | 4/2014 | Chung et al. |
| 8,699,159 B1 | 4/2014 | Malina |
| 8,699,171 B1 | 4/2014 | Boyle |
| 8,699,172 B1 | 4/2014 | Gunderson et al. |
| 8,699,175 B1 | 4/2014 | Olds et al. |
| 8,699,185 B1 | 4/2014 | Teh et al. |
| 8,700,850 B1 | 4/2014 | Lalouette |
| 8,743,502 B1 | 6/2014 | Bonke et al. |
| 8,749,910 B1 | 6/2014 | Dang et al. |
| 8,751,699 B1 | 6/2014 | Tsai et al. |
| 8,755,141 B1 | 6/2014 | Dang |
| 8,755,143 B2 | 6/2014 | Wilson et al. |
| 8,756,361 B1 | 6/2014 | Carlson et al. |
| 8,756,382 B1 | 6/2014 | Carlson et al. |
| 8,769,593 B1 | 7/2014 | Schwartz et al. |
| 8,773,802 B1 | 7/2014 | Anderson et al. |
| 8,780,478 B1 | 7/2014 | Huynh et al. |
| 8,782,334 B1 | 7/2014 | Boyle et al. |
| 8,793,532 B1 | 7/2014 | Tsai et al. |
| 8,797,669 B1 | 8/2014 | Burton |
| 8,799,977 B1 | 8/2014 | Kapner, III et al. |
| 8,819,375 B1 | 8/2014 | Pruett et al. |
| 8,825,976 B1 | 9/2014 | Jones |
| 8,825,977 B1 | 9/2014 | Syu et al. |
| 2003/0126232 A1* | 7/2003 | Mogul ............ G06F 17/30902 709/219 |
| 2004/0230739 A1* | 11/2004 | Tsern .................. G06F 1/3203 711/105 |
| 2009/0113702 A1 | 5/2009 | Hogg |
| 2010/0058000 A1* | 3/2010 | Moyer ............... G06F 12/0831 711/146 |
| 2010/0146205 A1 | 6/2010 | Baum et al. |
| 2010/0306551 A1 | 12/2010 | Meyer et al. |
| 2011/0119442 A1* | 5/2011 | Haines ............... G06F 12/0246 711/113 |
| 2011/0226729 A1 | 9/2011 | Hogg |
| 2012/0159042 A1 | 6/2012 | Lott et al. |
| 2012/0275050 A1 | 11/2012 | Wilson et al. |
| 2012/0281963 A1 | 11/2012 | Krapf et al. |
| 2012/0324980 A1 | 12/2012 | Nguyen et al. |
| 2014/0201424 A1 | 7/2014 | Chen et al. |
| 2014/0205012 A1* | 7/2014 | Lee ..................... H04N 19/42 375/240.16 |
| 2014/0281229 A1 | 9/2014 | Kowles |
| 2015/0143043 A1* | 5/2015 | Maddah-Ali ....... G06F 12/0813 711/119 |

\* cited by examiner

FULLNESS CONTROL FOR MEDIA-BASED CACHE OPERATING IN A STEADY STATE

TECHNICAL FIELD

This disclosure relates to information storage and, more particularly, to systems and methods for managing data storage devices with a media-based cache.

BACKGROUND

Many computing systems generate or receive data that may be desirable to store for a period of time. These computing systems often utilize a data storage device for data storage and retrieval. In many cases, the data storage device receives access commands from a host device. These access commands include read commands, write commands, and so on. Oftentimes, a data communication protocol specifies particular parameters for implementing and/or servicing the access commands received by the data storage device.

Each access command serviced by the data storage device is associated with an overhead defined by the data storage device itself. Thus, on average, the data storage device performs a high number of operations per second when servicing an access command for a large amount of data. Conversely, on average, the data storage device performs a lower number of operations per second when servicing an access command for a small amount of data.

BRIEF DESCRIPTION OF THE DRAWINGS

Reference will now be made to representative embodiments illustrated in the accompanying figures. It should be understood that the following descriptions are not intended to limit the disclosure to one preferred embodiment. To the contrary, each is intended to cover alternatives, modifications, and equivalents as may be included within the spirit and scope of the described embodiments as defined by the appended claims.

DETAILED DESCRIPTION

Figure 1:
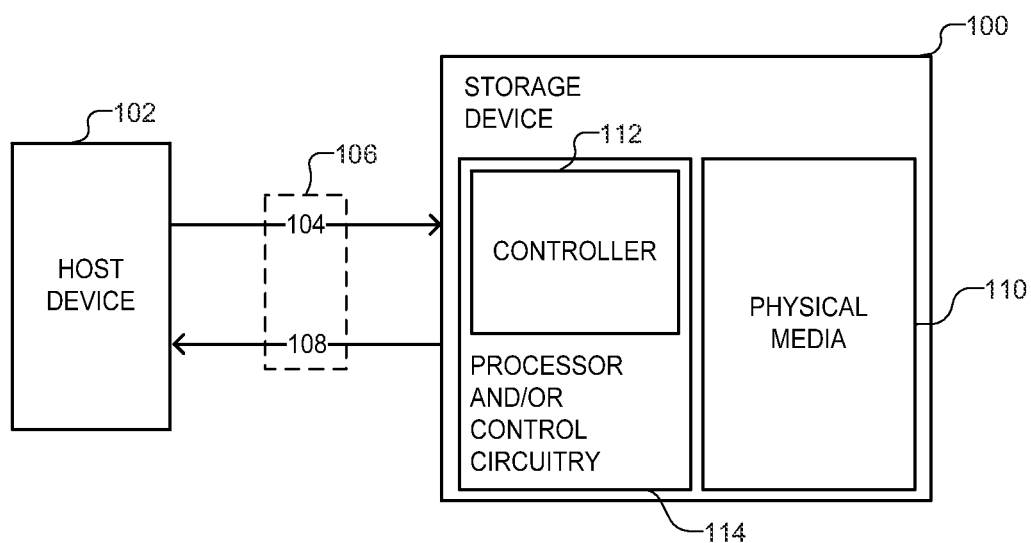
FIG. 1 depicts a block diagram of an example data storage device that may be configured to communicate with a host device.

Some embodiments described herein reference systems and methods for caching non-sequential write commands (e.g., "random writes") received by a data storage device from a host device. In many cases, the data storage device may be a hard disk drive ("HDD") including one or more rotating magnetic disks (the "physical media"). Such systems and methods cache non-sequential write commands within a reservation of a mainstore of the data storage device (herein, the "media-based cache" or "MBC"). Additionally, some embodiments described herein reference methods for managing the MBC in a steady-state manner, substantially independent of the type, quantity, size, or frequency of non-sequential write commands received from the host device.

The steady-state of the media-based cache can be obtained by directing non-sequential write commands and data received from the host device to multiple independent cache locations and, thereafter, selectively copying or moving such data between the caches so that none of the caches are either too full or too empty. In this manner, a non-sequential write command can be cached in a power-safe manner until it is efficient and/or convenient to write such data to the mainstore portion of the physical media.

More particularly, some embodiments described herein initially receive and cache non-sequential write commands, in time-order, in a high-speed memory (e.g., DRAM) that is power-safe (e.g., write-cache enabled data storage system with a power-safe write buffer). Thereafter, the data storage device reports to the host device that the data has been written in a power-safe manner. Subsequently received non-sequential write commands are also cached, in the order in which they are received, in the power-safe high-speed memory.

Upon determining that the power-safe high-speed memory is full, data contained therein can be written sequentially (e.g., in time-received order) to the media-based cache reservation of the physical media of the data storage device. Upon determining that the media-based cache is approaching a selected fullness threshold, at least a portion of the data contained therein can be copied to a holding pool within the high-speed memory (e.g., a portion of the DRAM, which in many cases separate from the power-safe region) and sorted and/or mapped by logical block address. At a later point, the sorted data within the holding pool can be written to the mainstore of the data storage device. In some implementations, the data in the holding pool is written to the mainstore when such a write would be convenient and/or advisable to perform (e.g., when the overhead of writing such data would be low and/or already expended by the performance of another operation).

By maintaining the fullness state of the media-based cache, the data storage device can service non-sequential write commands at a substantially constant rate, regardless of the time, order, size, or frequency with which such commands are received. In this manner, the data storage device can exhibit substantially reduced command-servicing time variability over a conventional data storage device. Such a system is generally referred to herein as a "write-caching subsystem" of a data storage device implementing a steady-state media-based cache.

FIG. 1 depicts a block diagram of an example data storage device 100 that can implement a write-caching subsystem including a steady-state media-based cache. The data storage device 100 is configured to communicate with a host device 102. The host device 102 can send an access command 104 over a connection (e.g., wireless or wired) to the data storage device 100. The access command 104 can be any number of suitable commands or instructions including, but not limited to, write commands and read commands. In many embodiments, the access command 104 can conform to a protocol 106 that defines a communication format to facilitate data transactions between the host device 102 and the data storage device 100. Upon receiving the access command 104, the data storage device 100 may service the access command 104 and, if required or requested, submit a response 108 to the host device 102. The response 108 may be in the same format and/or may conform to the same protocol as the access command 104. For example, if the host device 102 sends an access command 104 to read data, the data storage device 100 can send a response 108 conforming to the protocol 106 with the requested data.

The data storage device 100 can include a physical media 110. The physical media 110 can be implemented as one or more disks formed from a magnetic material onto (and/or into) which data can be recorded as patterns of magnetic polarity. In other embodiments, the physical media 110 can be another type of physical media such as flash storage, optical storage, tape storage, and so on.

The data storage device 100 can also include a controller 112 in communication with the physical media 110. The controller 112 can manage or coordinate the reading and/or the writing of data to the physical media 110. Additionally, the controller 112 can serve as an interface between the host device 102 and the physical media 110. For example, the controller 112 can facilitate data transactions between the physical media 110 and the host device 102 via the protocol 106.

In many cases, the controller 112 may be required to perform, monitor, or coordinate multiple discrete tasks in order to fully service an access command 104. For example, to respond to a write command, the controller 112 may translate a logical block address to a physical sector, access the physical sector on the physical media (e.g., perform a seek operation), encode the data to be written to the physical sector (e.g., error correction coding, encryption, and so on), and write the encoded data to the physical sector.

As noted above, the maximum time expense (e.g., overhead) associated with the seek operation may be substantially independent of the quantity of data to be written to the physical media 110. In other words, a large amount of data can be typically written at a higher average rate than a small amount of data because the relative proportion of total time writing to total time seeking may be substantially greater when writing a large amount of data than when writing a small amount of data. Similarly, multiple commands, whether large-size or small-size, that are physically located nearby one another on the physical media 110 may be serviced sequentially. In this manner, the "sequentiality" of a write command may be related to both the size of the command and to the location of other write commands received near-in-time (e.g., shortly before or shortly after) to the received command.

For example, the data storage device 100 may be configured to write 512B of data in 1 μs after performing a 10 ms seek operation. Accordingly, the write command is serviced in a total of 10.001 ms at an approximate rate of 51 KB written per second. In another example, the data storage device 100 can write 1 MB of data in approximately 2000 μs after performing a 10 ms seek operation. Accordingly, the write command is serviced in a total of 12 ms at an approximate rate of 83 MB written per second. In another example, the data storage device 100 can write 1 GB of data in approximately 2000 ms after performing a 10 ms seek operation. Accordingly, the write command is serviced in total of 2.010 s at an approximate rate of 512 megabytes written per second. As may be appreciated, the rate at which the data storage device 100 services write commands may become substantially constant (e.g., may not increase) as the size of write commands (e.g., the quantity of data to be written) continues to increase in proportion to the time required to seek. For example, the data storage device 100 can write 10 GB of data in approximately 20 s after performing a 10 ms seek operation. In this example, the write command is serviced in a total of 20.010 s at an approximate rate, again, of 512 megabytes written per second.

Accordingly, as used herein, the term "non-sequential write" generally refers to write operations and commands that are generally of a small size and are received at a time or in an order such that servicing of the command would require a separate seek operation and the term "sequential write" generally refers to write operations and commands of a large size. The relative and/or absolute size of non-sequential writes and sequential writes can vary from embodiment to embodiment; no particular size is required to define either type of write. However, in many embodiments, the maximum size of a non-sequential write can be defined, at least in part, on the physical structure of the data storage device 100 and/or the physical media 110. More particularly, the maximum size of a non-sequential write can depend upon the amount of available space within a cache (e.g., host queue, volatile memory cache, and so on) of the data storage device and/or the number of tracks and/or the block or sector size of the physical media 110. In some examples, the maximum size of a non-sequential write can be defined as 256 host blocks of data.

Figure 2:
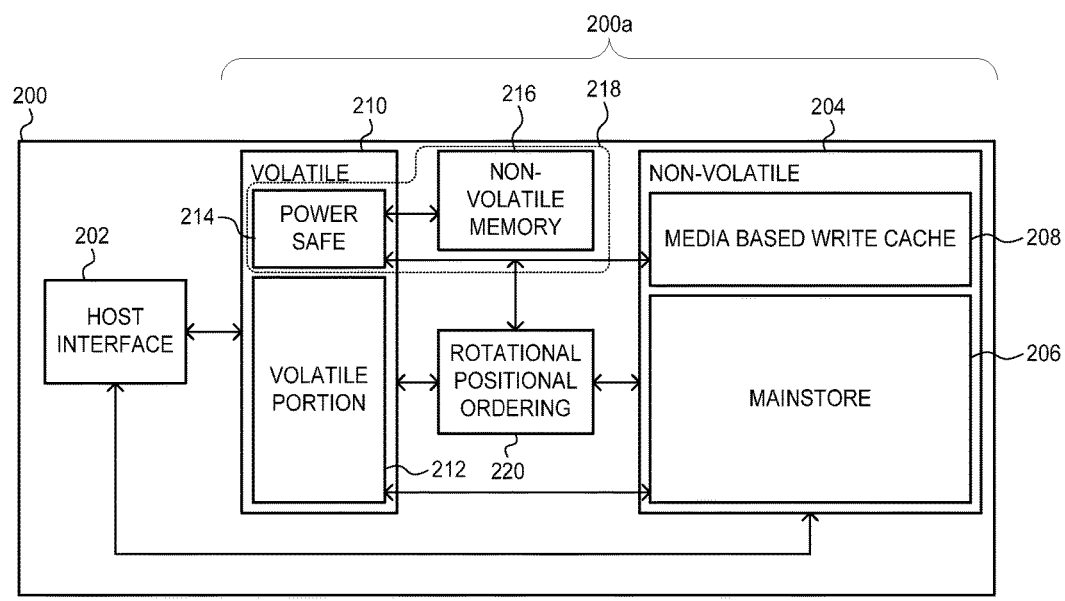
FIG. 2 depicts a block diagram of a portion of a data storage device operating a media-based cache in a steady state.

FIG. 2 depicts a block diagram of a portion of a data storage device 200 operating a media-based cache in a steady state. As with the embodiment depicted in FIG. 1, the data storage device 200 can include a host interface 202 that transacts data between a connected host device and a non-volatile physical storage 204 within the data storage device 200.

The non-volatile physical storage 204 can be implemented as a HDD including one or more rotating disks formed from a magnetic material, although such a configuration is not required. For example, the non-volatile physical storage 204 can be an SSD or an optical storage system. The non-volatile physical storage 204 can be partitioned, segmented, zoned, or sectioned in a variety of ways. For example, in some cases, the non-volatile physical storage 204 can be divided into sectors. In other examples, the non-volatile physical storage 204 can be partitioned. In many embodiments, the non-volatile physical storage 204 can be divided, either physically or logically, into two distinct portions, a mainstore 206 and a media-based cache 208.

In many cases, the host interface 202 can be coupled directly to the non-volatile physical storage 204, for example, to service a sequential write command by writing received data directly to the mainstore 206.

In other cases, the host interface 202 may cache a write command received from a host device within a write-caching subsystem 200a prior to writing that data to the mainstore 206. For example, as noted above, a write-caching subsystem such as the write-caching subsystem 200a can include multiple volatile and/or non-volatile memory locations into which data received from a host can be cached. More particularly, the write-caching subsystem 200a receives and cache non-sequential write commands, in time-order, in a high-speed memory such as the volatile memory 210 that is at least partially power-safe (e.g., write-cache enabled data storage system with a power-safe write buffer).

More specifically, the volatile memory 210 can be divided, either physically or logically, into a volatile portion 212 and a power-safe region 214. Subsequently-received non-sequential write commands can also be cached within the power-safe region 214, in the time order in which they are received.

Thereafter, the write-caching subsystem 200a can determine that the volatile memory 210 is full or is approaching fullness. In response, data contained in the power-safe region 214 can be written sequentially (e.g., in time order) to the media-based cache 208. Thereafter, upon determining that the media-based cache 208 is itself approaching a selected fullness threshold, the write-caching subsystem 200a can copy at least a portion of the data in the media-based cache 208 to a holding pool within the volatile portion 212 of the volatile memory 210. Upon copying said data, the write-caching subsystem 200a also sorts and/or maps the data so that, at a later point, the sorted data within the holding pool can be written to the mainstore 206 when such a write would be convenient and/or advisable to perform. In many cases, the write-caching subsystem 200a can transfer data between the power-safe region 214, the media-based cache 208, the volatile region 212, and the mainstore 206 in order to effect a substantially steady state operation (e.g., constant or semi-constant average number of operations per section).

Expanding upon embodiments presented above, the volatile memory 210 can be implemented as a high-speed memory such as a dynamic random-access memory (herein, "DRAM"). As with the non-volatile physical storage 204 and as noted above, the volatile memory 210 can be partitioned or otherwise divided, either physically or logically, into one or more portions such as a volatile region 212 and a power-safe region 214.

The power-safe region 214 can be coupled to a separate non-volatile memory 216. The separate non-volatile memory 216 can be flash memory or any other suitable non-volatile memory type. In these embodiments, when the volatile memory 210 (and, thus by extension the power-safe region 214 thereof) experiences a power loss, a reserve power source (e.g., reserve battery, capacitive storage, energy generated from the rotation of the non-volatile physical storage 204, and so on; not shown in FIG. 2) can be used to briefly power the volatile memory 210 to effect an emergency transfer of data from the power-safe region 214 into the separate non-volatile memory 216. When power is restored, data from the separate non-volatile memory 216 can be read and thereafter written back into the volatile memory 210 or to a portion of the non-volatile physical storage 204. In this manner, data written from the host interface 202 to the power-safe region 214 can be protected from power loss. The combination of the power-safe region 214 and the separate non-volatile memory 216 define a power-safe write buffer (herein, "PSWB") to cache non-sequential write commands from the host interface 202. The power-safe write buffer is identified in FIG. 2 as the PSWB 218.

After the host interface 202 receives a non-sequential write command and caches the command in the PSWB 218, the data storage device 200 can await the arrival of subsequent non-sequential write commands to cache until the write-caching subsystem 200a determines that the PSWB 218 is approaching fullness.

Upon determining the PSWB 218 is full, the write-caching subsystem 200a can effect a transfer of data from the PSWB 218 (e.g., the power-safe region 214) to the media-based cache 208. In many embodiments, the data can be written to the media-based cache in a sequential manner. Although FIG. 2 is illustrated with a directional signal path directly between the power-safe region 214 and the media-based cache 208, such a configuration is not required. For example, in some embodiments, the transferred data may be passed into a rotational positional ordering module (which may be controlled/executed by a controller of the data storage device) (herein, the "RPO"). The RPO 220 can determine an optimal or semi-optimal order or location (or locality range) for writing data from the power-safe region 214 to the media-based cache 208. For example, in many embodiments, the media-based cache 208 may be partitioned into a series of independently-writable partitions. In these embodiments, the RPO 220 can select a partition of the media-based cache 208 for writing data from the PSWB 218.

In many embodiments, the data contained within the PSWB 218 may be written to the media-based cache 208 (or a partition thereof) sequentially, despite that such data is not necessarily received in any particular sequential order. In these embodiments, the data may be written to the media-based cache 208 in this manner so as to effect the highest-speed transfer between the PSWB 218 and the media-based cache 208 supportable by the hardware of the non-volatile physical storage 204. In other words, transferring data from the PSWB 218 to the media-based cache 208 can be performed at a rate equivalent to (or approaching) the rate of a sequential write. Herein, the operation of transferring non-ordered and/or non-sequential data from the PSWB 218 to the media-based cache 208 is generally referred to as an "enqueuing" operation.

Upon completion of an enqueuing operation, the PSWB 218 may be prepared to accept and cache subsequently-received non-sequential write requests while other operations of the write-caching subsystem 200a are performed and/or monitored in parallel.

At a later point, the write-caching subsystem 200a can determine that the media-based cache (and/or a partition thereof) has exceeded a selected fullness threshold. In response, the write-caching subsystem 200a can copy data from the media-based cache 208 back into the volatile memory 210, specifically into the volatile region 212, into what is referred to herein as a "holding pool." Such an operation is generally referred to herein as a "slurping" operation. In many embodiments, only a small portion (e.g., a single partition or smaller) of the media-based cache 208 is slurped at a time.

In many cases, a slurping operation can be performed or assisted by the RPO 220. For example, should the write-caching subsystem 200a determine that a slurp operation should occur, the write-caching subsystem 200a may request the RPO 220 to determine a partition or portion of the media-based cache 208 to slurp.

Additionally, upon slurping data from at least a portion of the media-based cache 208 into the volatile region 212, the write-caching subsystem 200a may also map and/or otherwise organize the data being slurped. For example, the write-caching subsystem 200a can assemble and maintain a data structure such as a self-balancing binary search tree, linked list, table, or another data structure, and the structure may organize the addresses of associated data in the media-based cache that will eventually need to be written to the mainstore. In this manner, all data within the holding pool may be mapped, organized and/or otherwise sorted, contrary to data within the media-based cache 208 in which data is received and stored in time-order.

Therefore, at a later point, the sorted data within the holding pool can be written to the mainstore 206 of the data storage device 200 when such a write would be convenient and/or advisable to perform. Herein, the operation of transferring organized data from the holding pool of within the volatile portion 212 to mainstore 206 is generally referred to as a "flushing" operation.

In many cases, a flushing operation can be performed or assisted by the RPO 220. For example, should the write-caching subsystem 200a determine that a flushing operation should occur, the write-caching subsystem 200a may submit an organized group (e.g., subset of the data within the holding pool) to the RPO 220 (herein, the "RPO pool"). The RPO 220 can select individual non-sequential write operations from the RPO pool that may be convenient and/or efficient to service at a particular time. Thereafter, the write-caching subsystem 200a can either withdraw the RPO pool back into the holding pool or the write-caching subsystem 200a can refill the RPO pool with additional non-sequential write operations from the holding pool.

In these embodiments, the write-caching subsystem 200a can selectively perform enqueuing operations, slurping operations, and flushing operations so as to provide a substantially consistent rate for servicing non-sequential write commands. In some examples, the write-caching subsystem 200a can coordinate enqueuing operations, slurping operations, and flushing operations in order to provide substantially consistent rate for servicing non-sequential write commands for a particular period of time. More specifically, the write-caching subsystem 200a can have both a standard (e.g., "normal") rate and another accelerated rate (e.g., burst rate).

In other cases, the write-caching subsystem 200a can selectively perform enqueuing operations, slurping operations, and flushing operations based on a variety of parameters of the data storage system 200. For example, the write-caching subsystem 200a can be implemented to maintain a certain selected fullness of the media-based cache 208, selectively enqueuing, slurping, and flushing in a manner that maintains the selected fullness.

In another example, the write-caching subsystem 200a can be implemented to maintain, within a selected tolerance, a certain selected fullness of the PSWB 218, by selectively enqueuing, slurping, and flushing in a manner that maintains the selected fullness.

In another example, the write-caching subsystem 200a can be implemented to maintain, within a selected tolerance, a certain selected fullness of the holding pool of the volatile portion 212, by selectively enqueuing, slurping, and flushing in a manner that maintains the selected fullness.

In another example, the write-caching subsystem 200a can be implemented to maintain, within a selected tolerance, a selected minimum non-sequential write servicing rate, by selectively enqueuing, slurping, and flushing in a manner that maintains the selected minimum rate.

In another example, the write-caching subsystem 200a can be implemented to maintain, within a selected tolerance, a selected minimum (or average) input/output operations per second (herein, "IOPS") rating, by selectively enqueuing, slurping, and flushing in a manner that maintains the selected minimum rate. In many cases, the IOPS rating of a data storage device may be obtained by subjecting the data storage device to various tests in which sequential write, non-sequential write, sequential read, non-sequential read, and other operations are requested by a host device. Thereafter, the total number of operations performed by the data storage device can be time-averaged to obtain an IOPS rating therefor.

In another example, the write-caching subsystem 200a can be implemented to maintain, within a selected tolerance, a selected maximum (or time-average) IOPS variability rating, by selectively enqueuing, slurping, and flushing in a manner that maintains the selected average variability.

In another example, the write-caching subsystem 200a can be implemented to maintain a selected number of total non-sequential write commands currently within the write-caching subsystem 200a that have not yet been flushed to the mainstore 208. Herein, the sum total of such commands is referred to as "total writes-in-flight." In some embodiments, the write-caching subsystem 200a can be implemented to maintain, within a selected tolerance, an average total writes-in-flight by selectively enqueuing, slurping, and flushing in a manner that maintains the selected average.

In yet further embodiments, the write-caching subsystem 200a can be implemented to maintain more than one of the examples provided above by selectively enqueuing, slurping, and flushing. For example, the write-caching subsystem 200a can be configured to maintain a selected fullness of the media-based cache in addition to maintaining a selected average total writes-in-flight.

Figure 3:
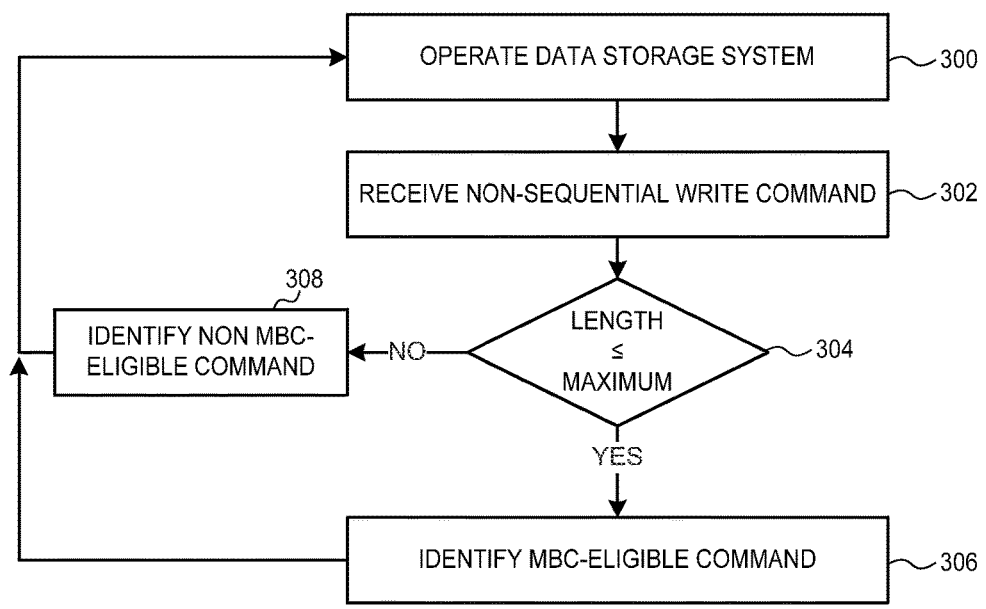
FIG. 3 depicts a flow chart of sample operations for managing a data storage system implementing a write-caching subsystem incorporating a steady-state media-based cache.

FIG. 3 depicts a flow chart of sample operations for managing a data storage system implementing a write-caching subsystem incorporating a steady-state media-based cache. The method begins at operation 300 in which the data storage system can operate. At operation 302, the data storage system receives a write command from a host device. At operation 304, the data storage system determines whether the received write command is sufficiently small to be considered a non-sequential write command that can be cached within the write-caching subsystem incorporating the steady-state media-based cache. More specifically, the data storage system determines whether the length of the command write command received is below or equal to a maximum command length. If the command received is less than the maximum command length, the method continues to operation 306 at which the data storage system identifies the command as eligible for caching within the media-based cache. Alternatively, should the command be longer than the maximum command length, the method continues to operation 308 at which the data storage system identifies the command as ineligible for caching.

In many embodiments, a method such as depicted in the flow chart of FIG. 3 is performed or otherwise carried out, either partially or entirely, by a host interface, such as the host interface 202 depicted in FIG. 2. In other examples, the method such as depicted is performed or otherwise carried out, either partially or entirely, by a controller such as the controller 112 depicted in FIG. 1.

Figure 4:
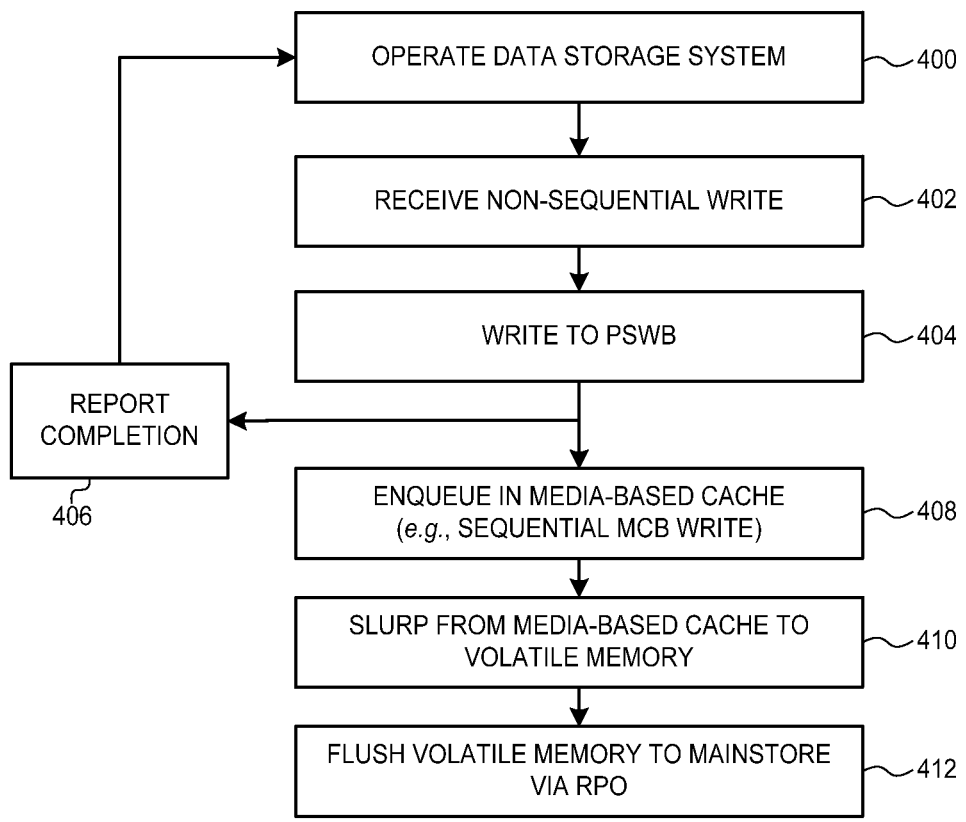
FIG. 4 depicts a flow chart of sample operations of a method for caching non-sequential write commands prior to writing said commands to the physical media of a data storage system.

FIG. 4 depicts a flow chart of sample operations of a method for caching non-sequential write commands prior to writing said commands to the physical media of a data storage system. The method begins at operation 400 in which a data storage system implementing a write-caching subsystem can operate. At operation 402, the data storage system receives a non-sequential write that is eligible for caching within the write-caching system. At operation 404, the non-sequential write instruction is stored within a PSWB associated with the data storage system. After operation 404, one or more operations can occur.

For example, after the operation 404, the data storage system reports to a host device that the non-sequential write command has been fully serviced at operation 406. Additionally, after operation 404, the method continues to operation 408 in which the non-sequential write command is enqueued within a media-based cache. At a later time, the method continues at operation 410 in which the non-sequential write command is slurped from the media-based cache into a volatile memory. At a later time, the method continues to operation 412 in which the non-sequential write command is flushed from the volatile memory to a mainstore of the data storage system. In many cases, one or more of the operations of the method depicted in FIG. 4 can be performed with the assistance or oversight of an RPO. For example, in some embodiments, the enqueuing operation performed at operation 408 can be performed with the assistance or oversight of the RPO. Additionally, in some embodiments, the slurping operation performed at operation 410 can be performed with the assistance or oversight of the RPO. Further, in some embodiments, the flush operation performed at operation 412 can be performed with the assistance or oversight of the RPO.

As with other embodiments described and depicted herein, the method described above can be performed or otherwise carried out, either partially or entirely, by a host interface, such as the host interface 202 depicted in FIG. 2. In other examples, the method depicted in FIG. 4 can be performed or otherwise carried out, either partially or entirely, by a controller such as the controller 112 depicted in FIG. 1.

Figure 5:
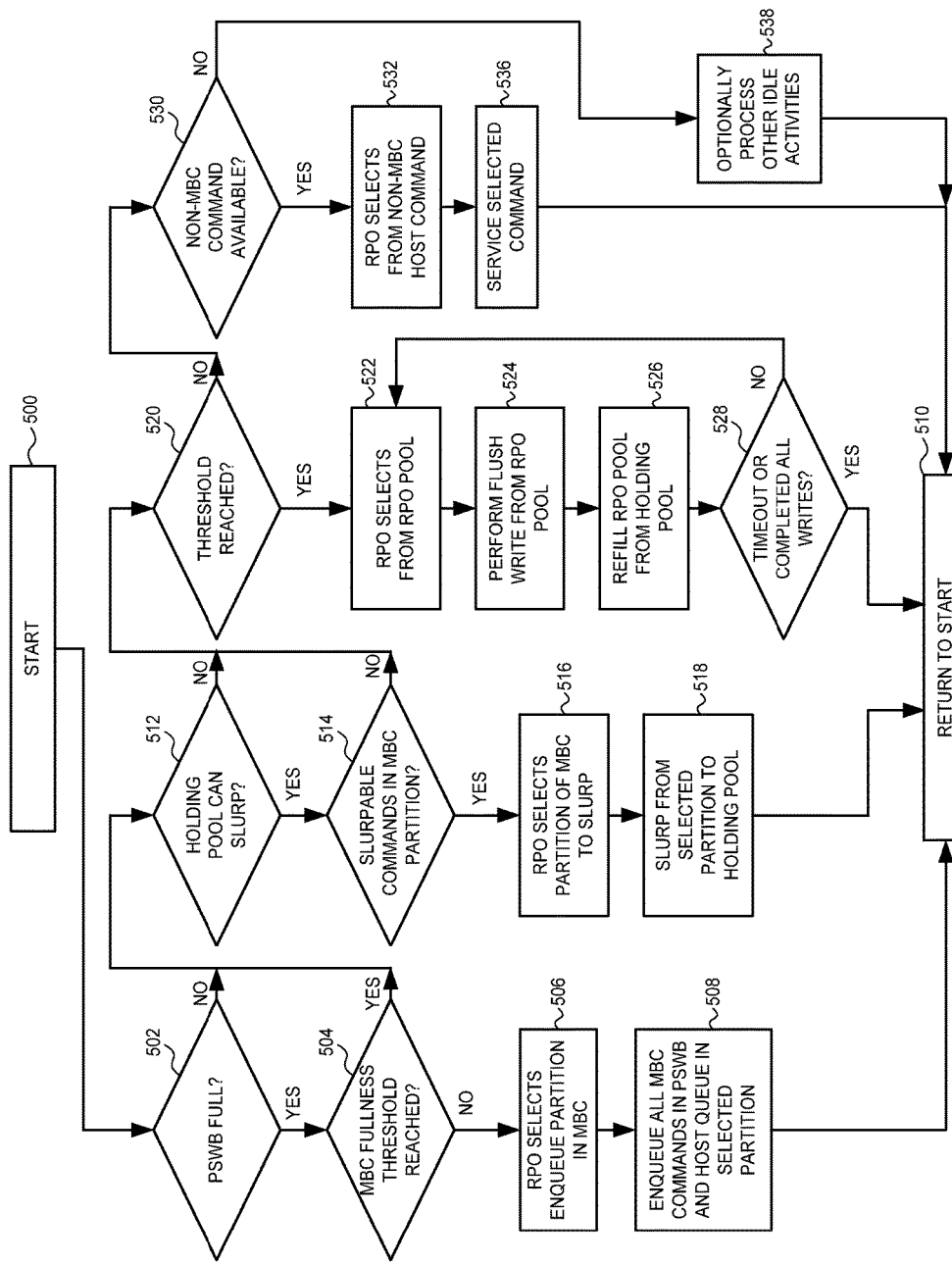
FIG. 5 depicts a flow chart of sample operations for managing a media-based cache in a steady state.

FIG. 5 depicts a flow chart of sample operations for managing write-caching subsystem with a media-based cache maintained in a steady state, such as depicted in FIG. 2. The method is generally presented as a semi-hierarchical decision tree including five major decision branch paths. To facilitate an understanding of the method depicted, the five major decision branches are described below from left to right. The method begins at operation 500.

The first major decision branch of the method for managing the media-based cache in a steady state as depicted in FIG. 5 relates to enqueueing operations as described herein. The decision branch begins from operation 500 at operation 502 in which the write-caching subsystem determines whether the PSWB of the write-caching subsystem is full. In many cases, the PSWB can be determined to be full when the PSWB no longer contains addressable space to cache a single subsequent non-sequential write command. In such a case, the operation 502 continues upon determining that the PSWB no longer contains additional addressable space. In other embodiments, the operation 502 continues after the data storage system receives a subsequent non-sequential write command (e.g., in a host queue) after the PSWB is already entirely full.

Upon determining that the PSWB is full, the first major decision branch of the method continues to operation 504 in which the write-caching subsystem determines whether the media-based cache of the write-caching subsystem has exceeded a particular selected fullness threshold. As noted with respect to other embodiments described herein, the selected fullness threshold can vary from embodiment to embodiment.

Upon determining that the media-based cache has not exceeded the selected threshold (and, therefore, contains enough space to enqueue commands within the PSWB), the first major decision branch of the method continues to operation 506 in which the RPO selects a particular partition (or location) of the media-based cache into which data from the PSWB should be enqueued. Thereafter, at operation 508, the write-caching subsystem can enqueue (e.g., move) data of the PSWB within the media-based cache. In some embodiments, the entire content of the PSWB can be enqueued within the media-based cache. In other embodiments, only a portion of the content of the PSWB can be enqueued. Thereafter, the first major decision branch of the method proceeds to operation 510, which, in turn, loops back to operation 500 to define a repeating operational loop.

The second major decision branch of the method for managing the media-based cache in a steady state as depicted in FIG. 5 relates to slurping operations as described herein. The decision branch begins, either from the NO branch of the determination in operation 504 or operation 502, at operation 512 in which the write-caching subsystem determines whether the holding pool can slurp new commands from the media-based cache.

Upon determining that the holding pool contains space to slurp commands from the media-based cache, the second major decision branch of the method continues to operation 514 in which the write-caching subsystem determines whether the media-based cache contains commands that are able to be slurped into the holding pool.

Upon determining that the media-based cache contains commands that are able to be slurped into the holding pool, the second major decision branch of the method continues to operation 516, in which the RPO selects a particular partition (or location) of the media-based cache from data may be slurped. Thereafter, at operation 518, the write-caching subsystem slurps (e.g., copy) data from the RPO-selected portion of the media-based cache to the holding pool. In some embodiments, the entire content of an RPO-selected media-based cache partition can be slurped. In other embodiments, only a portion of the content of the RPO-selected media-based cache partition can be slurped. Thereafter, the second major decision branch of the method proceeds to operation 510, which as noted above, loops back to operation 500 to define a repeating operational loop.

The third major decision branch of the method for managing the media-based cache in a steady state as depicted in FIG. 5 relates to flushing operations as described herein. The decision branch begins, either from the NO branch of the determination in operation 512 or operation 514, at operation 520 in which the write-caching subsystem determines whether the media-based cache of the write-caching subsystem has exceeded a particular selected fullness threshold. As noted with respect to other embodiments described herein, the selected fullness threshold can vary from embodiment to embodiment.

Upon determining that the media-based cache of the write-caching subsystem has exceeded the selected fullness threshold, the third major decision branch of the method continues to operation 522 in which the RPO selects one or more non-sequential write commands from the RPO pool to flush to mainstore. Next at operation 524, a flush may be performed to the RPO-selected non-sequential write commands from the RPO pool. Thereafter, at operation 526, the RPO pool can be refilled from the holding pool. In some embodiments, the write-caching subsystem selects non-sequential write commands within the holding pool to fill the RPO pool. In other embodiments, the RPO selects non-sequential write commands within of the holding pool to refill the RPO pool. Thereafter, at operation 528, the write-caching subsystem determines whether the holding pool and the RPO pool are non-empty (e.g., still contain flushable non-sequential write operations). Additionally, operation 528 determines whether a selected timeout has elapsed. Should the write-caching subsystem determine that the holding pool and the RPO pool are non-empty and that the timeout has not yet elapsed, the third major decision branch of the method can return to operation 522.

Alternatively, if it is determined that a timeout has occurred or all flush writes are completed, the third major decision branch of the method proceeds to operation 510, which as noted above, loops back to operation 500 to define a repeating operational loop. In many embodiments, the timeout may be selected (or adjusted) by the write-caching subsystem in order to facilitate steady state operation of the media-based cache.

The fourth major decision branch of the method for managing the media-based cache in a steady state as depicted in FIG. 5 relates to non-caching operations of the data storage system as described herein. The decision branch begins, from the NO branch of the determination in operation 520, at operation 530 in which the write-caching subsystem can determine whether a non-cacheable command (e.g., not cached or managed by the write-caching subsystem) is available for processing. Non-cacheable commands can include a SATA flush request, a S.M.A.R.T. command, an identify command, a drive configure command and so on.

Thereafter, at operation 532, the RPO selects a command from a pool of non-cacheable commands. Next at operation 536, the RPO-selected command can be serviced. Thereafter, the fourth major decision branch of the method proceeds to operation 510, which as noted above, loops back to operation 500 to define a repeating operational loop.

The fifth major decision branch of the method for managing the media-based cache in a steady state as depicted in FIG. 5 relates to idle operations of the data storage system as described herein. The decision branch begins, from the NO branch of the determination in operation 530, at operation 538 in which the write-caching subsystem determines whether to perform idle activities such as enqueuing, slurping, or flushing while the host is idle. Thereafter, the fifth major decision branch of the method proceeds to operation 510, which as noted above, loops back to operation 500 to define a repeating operational loop.

As with other embodiments described and depicted herein, the method described above can be performed or otherwise carried out, either partially or entirely, by a host interface, such as the host interface 202 depicted in FIG. 2. In other examples, the method depicted in FIG. 5 can be performed or otherwise carried out, either partially or entirely, by a controller such as the controller 112 depicted in FIG. 1.

Figure 6A:
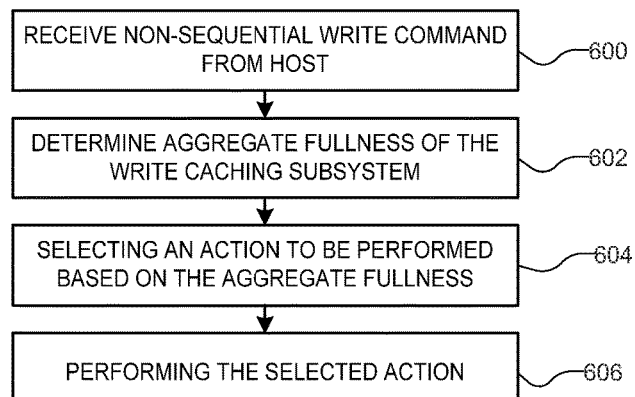
FIGS. 6A-6B depict a flow chart and block diagram of a data storage device incorporating a write-caching subsystem implementing a steady-state media-based cache The use of the same or similar reference numerals in different drawings indicates similar, related, or identical items where appropriate.
Figure 6B:
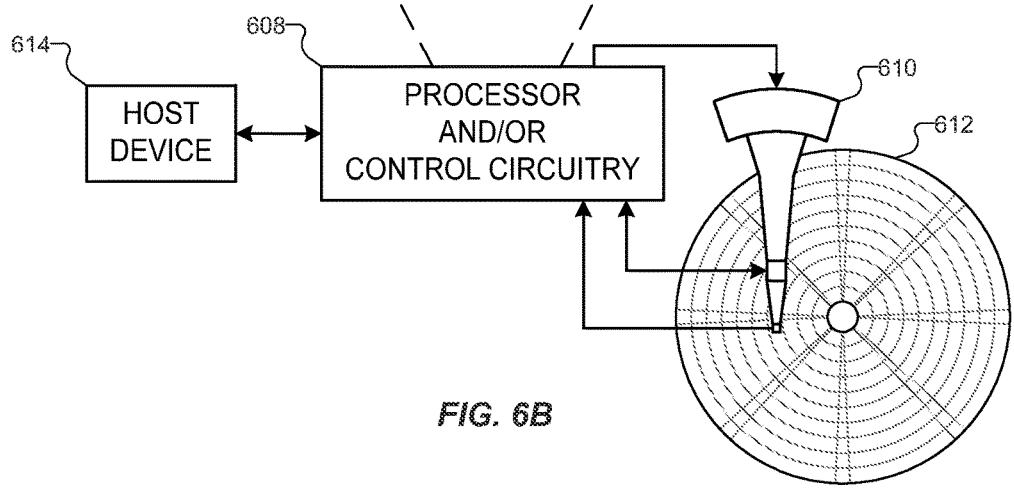

FIGS. 6A-6B depict a flow chart and block diagram of a data storage device incorporating a write-caching subsystem implementing a steady-state media-based cache. The method of FIG. 6A begins at operation 600 in which a write command is received from a host. Next, at operation 602, an aggregate fullness (or an aggregate fullness status) of a write-caching subsystem is determined. Next at operation 604, an action to be performed (e.g., enqueuing, slurping, flushing, servicing a non-cacheable command, servicing a read command, servicing another command, and so on) is selected based on the determined aggregate fullness. Next, at operation 606, the selected action is performed.

In many embodiments, the method of FIG. 6A can be implemented by an HDD data storage device, such as depicted by the flow chart of FIG. 6B. As one example, the data storage device can include a processor 608 that can perform, monitor, or coordinate one or more of the operations of the data storage device. The processor 608 can be connected to a voice coil motor 610 ("VCM") that controls the location of a read head and a write head along a rotatable disk 612 that is formed from a magnetic material. The processor 608 may also communicate with one or more host devices 614.

Some embodiments described herein relate to data storage systems and data storage devices and methods of operating the same. It should be appreciated that the various embodiments described herein, as well as functionality, operation, components, and capabilities thereof may be combined with other elements as necessary, and so any physical, functional, or operational discussion of any element or feature is not intended to be limited solely to a particular embodiment to the exclusion of others. For example, the host device 102 as depicted in FIG. 1 may be any suitable electronic device such as a laptop computer, desktop computer, server, cellular phone, tablet computer, and so on. In some embodiments, the host device 102 can be implemented as a system of individual electronic devices such as a network of servers. Additionally, although many embodiments described herein reference hard disk drives ("HDD") containing one or more magnetic recording disks, other physical media and data storage devices such as solid state drives ("SSD"), flash storage devices, tape storage devices, hybrid storage devices, optical storage devices, and the like may be equally applicable to one, many, or all embodiments described herein or variants thereof.

As another example, the controller 112 of FIG. 1 can be implemented as an electrical circuit, as an integrated circuit, as a series of instructions (e.g., firmware) executed by a processor 114, or as a combination thereof. In many embodiments, the controller 112 can perform, monitor, and/or coordinate one or more operations of the data storage device 100 depicted in FIG. 1. Similarly, the host interface 202 of FIG. 2 can be implemented as an electrical circuit, as an integrated circuit, as a series of instructions executed by a processor, or as a combination thereof. The host interface 202 can contain and/or can be placed in communication with additional hardware components that assist in the programming and/or execution of commands that the data storage device 200 is configured to perform.

As another example, the mainstore 206 of FIG. 2 can, in some embodiments, represent the majority of the storage space provided by the non-volatile physical storage 204. The size of the mainstore 206 can be reported to a host device as the amount of available storage space provided by the data storage device 200. In this manner, the portion of the non-volatile physical storage 204 reserved for the media-based cache 208 may not, in all embodiments, be reported to a host device. In this manner, the media-based cache 208 can be a distinct and reserved portion of the non-volatile physical storage 204. Further, in some cases, the media-based cache 208 may occupy a selected physical location on the physical media of the non-volatile physical storage 204. For example, in one embodiment, the media-based cache 208 can be an outer track of the non-volatile physical storage.

In still further embodiments, the media-based cache 208 may be located in a physical location so as to provide a statistically advantageous position to which (or from which) the data storage device 200 can read. More particularly, in some embodiments, the media-based cache 208 can be disposed in a central track of the physical media of the non-volatile physical storage 204. In this configuration, the distance from the media-based cache 208 to any other location in the non-volatile physical storage 204 (e.g., any location within the mainstore 206) can be, on average, reduced. In these embodiments, transfer of data between the media-based cache 208 and the mainstore 206 may be more easily accomplished because of the reduced physical distance between the media-based cache 208 and the mainstore 206.

In one example, access commands can be received at the host interface 202 and thereafter placed into a command queue. In this manner, the host interface 206 and the command queue cooperate to enable the data storage device to receive and process more than one host command at a time.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not meant to be exhaustive or to limit the embodiments to the precise forms disclosed. It will be apparent to one of ordinary skill in the art that many modifications and variations are possible in view of the above teachings. In particular, any features described with respect to one embodiment may also be used in some embodiments, where compatible. Likewise, the features of the different embodiments may be exchanged, substituted, or omitted where compatible and appropriate.

Many embodiments of the foregoing disclosure may include or may be described in relation to various methods of operation, use, manufacture, and so on. Notably, the operations of methods presented herein are meant only to be exemplary and, accordingly, are not necessarily exhaustive. For example an alternate operation order, or fewer or additional steps may be required or desired for particular embodiments.

We claim:

1. A method of caching write commands received by a data storage system from a host, the data storage system comprising a physical media and a write-caching subsystem, the method comprising:
    receiving a write command from a host;
    determining an aggregate fullness status of the write-caching subsystem, the write-caching subsystem comprising a volatile memory and a media-based cache, the aggregate fullness based on a fullness status of at least a portion of the media-based cache;
    selecting, based on a state of the write-caching subsystem, an action to be performed, the action selected from:
        reducing the aggregate fullness status of the write-caching subsystem; and
        servicing a command from the host that is not managed by the write-caching subsystem; and
    performing the selected action.

2. The method of claim 1, wherein the fullness status is a first fullness status and an aggregate fullness status is further based on a second fullness status of at least a portion of the volatile memory.

3. The method of claim 1, wherein the operation of selecting an action to be performed is based in part on a fullness status of the media-based cache.

4. The method of claim 1, wherein performing the action to reduce the fullness of the write-caching subsystem comprises moving data within the media-based cache to a primary storage portion in the physical media.

5. The method of claim 1, wherein the volatile memory comprises:
    a first portion for buffering write data to be written to the media-based cache; and
    a second portion for storing data copied from the media-based cache to be written to a primary storage portion in the physical media.

6. The method of claim 5, wherein performing the action to reduce the fullness of the write-caching subsystem comprises moving data from the second portion of the volatile memory to a primary storage portion in the physical media.

7. The method of claim 5, wherein the operation of selecting an action to be performed is based in part on a determination of whether to perform an action to modify the fullness of the write-caching subsystem.

8. The method of claim 7, wherein performing an action to modify the fullness of the write-caching subsystem comprises enqueuing data of write commands from the first portion of the volatile memory into the media-based cache.

9. The method of claim 5, wherein the operation of selecting an action to be performed is based in part on a minimum batch number of write commands to be selected for rotational position optimization.

10. The method of claim 9, wherein the operation of selecting an action to be performed is based in part on determining whether to perform an action to read data from the media-based cache into the second portion of the volatile memory.

11. The method of claim 9, wherein the selected write commands are selected based on a locality range of write locations on the physical media.

12. A data storage system comprising:
    a host interface;
    a host command cache in communication with the host interface;
    a physical media comprising:
        a media-based cache; and
        a mainstore;
    a write cache subsystem in communication with the host command cache, the write cache subsystem comprising:
        a volatile memory comprising:
            a first portion for buffering write data to be written to the media-based cache; and
            a second portion for storing data copied from the media-based cache to be written to the mainstore; and
    a processor coupled to the host interface, the write-caching subsystem, and the physical media, the processor configured to perform the operations of:
        receiving a write command from a host;
        determining an aggregate fullness status of the write-caching subsystem the aggregate fullness based on a fullness status of at least a portion of the media-based cache;
        selecting, based on a state of the write-caching subsystem, an action to be performed, the action selected from:
            reducing the aggregate fullness status of the write-caching subsystem; and
            servicing a command from the host that is not managed by the write-caching subsystem; and
        performing the selected action.

13. The data storage system of claim 12, wherein the processor is further configured to perform rotational positional ordering on operations related to the write cache subsystem.

14. The data storage system of claim 12, wherein the operation of moving the write command from the first portion of the volatile memory to the media-based cache is performed by the processor upon determining that the first portion of the write cache subsystem exceeds a selected fullness threshold.

15. The data storage system of claim 12, wherein the physical media comprises at least one rotating magnetic disk.

16. The data storage system of claim 12, wherein the write cache subsystem comprises a dynamic random-access memory.

17. The data storage system of claim 12, wherein the media-based cache is partitioned.

18. A method of writing data to a physical media of a data storage system, the method comprising:
   determining that data to be written is eligible for storage within a media-based cache within the physical media;
   storing the data in a power-safe data cache;
   writing the data sequentially from the power-safe data cache to the media-based cache;
   copying the data from the media-based cache to a data holding cache on a volatile memory; and
   flushing the data holding cache to the physical media.

19. The method of claim 18, wherein the operation of determining that the data is eligible for storage within a media-based cache within the physical media comprises determining that the data is shorter than a selected minimum length.

20. The method of claim 18, wherein the operation of writing the data sequentially from the power-safe data cache to the media-based cache is performed by determining that the power-safe data cache exceeds a selected fullness threshold.

* * * * *